(12) United States Patent
Khan

(10) Patent No.: US 7,408,913 B2
(45) Date of Patent: Aug. 5, 2008

(54) METHOD OF REAL TIME HYBRID ARQ

(75) Inventor: Farooq Ullah Khan, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 810 days.

(21) Appl. No.: 10/435,978

(22) Filed: May 12, 2003

(65) Prior Publication Data

US 2004/0240400 A1   Dec. 2, 2004

(51) Int. Cl.
  *H04J 3/00*   (2006.01)
(52) U.S. Cl. .................. 370/345; 370/346; 370/347; 370/348; 370/349; 370/218; 370/242; 455/450; 455/451; 455/452.2; 455/464
(58) Field of Classification Search ............ 370/345, 370/346, 347, 348, 349, 218, 242, 328; 455/450, 455/451, 452.1, 452.2, 464
See application file for complete search history.

(56) References Cited

U.S. PATENT DOCUMENTS 6,477,164 B1 * 11/2002  Vargo et al. ............... 370/356
2001/0033560 A1 * 10/2001  Tong et al. ................ 370/337
2002/0069388 A1 *  6/2002  Niu et al. .................. 714/748
2002/0085487 A1 *  7/2002  Von Wendorff ............ 370/216
2003/0081690 A1    5/2003  Hun-Kee Kim, et al. .... 375/264
2003/0118031 A1 *  6/2003  Classon et al. ......... 370/395.54

FOREIGN PATENT DOCUMENTS

| EP | 1 246 385 | 10/2002 |
| EP | 1 253 729 | 10/2002 |
| EP | 1 276 267 | 1/2003 |
| WO | WO 02/37872 | 5/2002 |

OTHER PUBLICATIONS

European Search Report.
U.S. Appl. No. 09/936,104.
International Search Report, May 2000.

* cited by examiner

*Primary Examiner*—Stephen M D'Agosta

(57) ABSTRACT

A method of wireless communication. The method includes the step of transmitting at least a first sub-frame from a first voice frame. If the first sub-frame is received by the wireless unit, an acknowledgement message is transmitted, and the remaining sub-frames from that voice frame are not transmitted. If the first sub-frame is not received by the wireless unit, however, a non-acknowledgement message is transmitted. Here, the base station retransmits at least another sub-frame from the first voice frame.

8 Claims, 13 Drawing Sheets

| Information bits | Voice frame size / Frame Quality Indicator | Tail | Total bits | Modulation | Repetition | Puncturing rate | Coding rate (sub-frame#1 and sub-frame#2) |
|---|---|---|---|---|---|---|---|
| | | | | RL RC3 Enhanced | | | |
| 16 | 1/8th rate / 6 | 8 | 30 | QPSK | 12 | 4/5 | 1/4 |
| 40 | Quarter-rate / 6 | 8 | 54 | QPSK | 6 | 8/9 | 1/4 |
| 80 | Half-rate / 8 | 8 | 96 | QPSK | 4 | 3/4 | 1/4 |
| 172 | Full-rate / 12 | 8 | 192 | QPSK | 2 | 3/4 | 1/4 |

FIG. 6(a)

| Information bits | Voice frame size | Frame Quality Indicator | Tail | Total bits | Modulation | Repetition | Puncturing rate | Coding rate (sub-frame#1) | Coding rate (sub-frame#2) |
|---|---|---|---|---|---|---|---|---|---|
| | | | | FL Enhanced RC3 with 32-ary spreading and 5ms sub-frames (ERC3a) | | | | | |
| 16 | 1/8th rate | 6 | 8 | 30 | QPSK | 4 | 4/5 | 1/4 | 1/4 |
| 40 | Quarter-rate | 6 | 8 | 54 | QPSK | 2 | 8/9 | 1/4 | 1/4 |
| 80 | Half-rate | 8 | 8 | 96 | QPSK | 1 | 1 | 1/4 | 1/4 |
| 172 | Full-rate | 12 | 8 | 192 | QPSK | 1 | 1 | 1/2 | 1/4 |
| | | | | FL Enhanced RC3 with 64-ary spreading and 5ms sub-frames (ERC3b) | | | | | |
| 16 | 1/8th rate | 6 | 8 | 30 | QPSK | 2 | 4/5 | 1/4 | 1/4 |
| 40 | Quarter-rate | 6 | 8 | 54 | QPSK | 1 | 8/9 | 1/4 | 1/4 |
| 80 | Half-rate | 8 | 8 | 96 | QPSK | 1 | 1 | 1/2 | 1/4 |
| 172 | Full-rate | 12 | 8 | 192 | 8-PSK | 1 | 1 | 2/3 | 1/3 |
| | | | | FL Enhanced RC3 with 128-ary spreading and 5ms sub-frames (ERC3c) | | | | | |
| 16 | 1/8th rate | 6 | 8 | 30 | QPSK | 1 | 4/5 | 1/4 | 1/4 |
| 40 | Quarter-rate | 6 | 8 | 54 | QPSK | 1 | 8/9 | 1/2 | 1/4 |
| 80 | Half-rate | 8 | 8 | 96 | 8-PSK | 1 | 1 | 2/3 | 1/3 |
| 172 | Full-rate | 12 | 8 | 192 | 16-QAM (8-PSK) | 1 | 1 | 1 | ½ (2/3) |

FIG. 6(b)

METHOD OF REAL TIME HYBRID ARQ

BACKGROUND OF THE INVENTION

I. Field of the Invention

The present invention relates to telecommunications, and more particularly, to wireless communications.

II. Description of the Related Art

Wireless communications systems provide wireless service to a number of wireless or mobile units situated within a geographic region. The geographic region supported by a wireless communications system is divided into spatially distinct areas commonly referred to as "cells." Each cell, ideally, may be represented by a hexagon in a honeycomb pattern. In practice, however, each cell may have an irregular shape, depending on various factors including the topography of the terrain surrounding the cell. Moreover, each cell is further broken into two or more sectors. Each cell is commonly divided into three sectors, each having a range of 120 degrees, for example.

A conventional cellular system comprises a number of cell sites or base stations geographically distributed to support the transmission and reception of communication signals to and from the wireless or mobile units. Each cell site handles voice communications within a cell. Moreover, the overall coverage area for the cellular system may be defined by the union of cells for all of the cell sites, where the coverage areas for nearby cell sites overlap to ensure, where possible, contiguous communication coverage within the outer boundaries of the system's coverage area.

Each base station comprises at least one radio and at least one antenna for communicating with the wireless units in that cell. Moreover, each base station also comprises transmission equipment for communicating with a Mobile Switching Center ("MSC"). A mobile switching center is responsible for, among other things, establishing and maintaining calls between the wireless units, between a wireless unit and a wireline unit through a public switched telephone network ("PSTN"), as well as between a wireless unit and a packet data network ("PDN"), such as the Internet. A base station controller ("BSC") administers the radio resources for one or more base stations and relays this information to the MSC.

When active, a wireless unit receives signals from at least one base station or cell site over a forward link or downlink and transmits signals to at least one cell site or base station over a reverse link or uplink. There are many different schemes for defining wireless links or channels for a cellular communication system. These schemes include, for example, time-division multiple access ("TDMA"), frequency-division multiple access ("FDMA"), and code-division multiple access ("CDMA") type-designs.

In a CDMA scheme, each wireless channel is distinguished by a distinct channelization code (e.g., spreading code, spread spectrum code or Walsh code) that is used to encode different information streams. These information streams may then be modulated at one or more different carrier frequencies for simultaneous transmission. A receiver may recover a particular stream from a received signal using the appropriate Walsh code to decode the received signal.

Wireless communications systems employ a number of geographically distributed, cellular communication sites or base stations. Each base station supports the transmission and reception of communication signals to and from stationary or fixed, wireless communication devices or units. Each base station handles communications over a particular region commonly referred to as a cell/sector. The overall coverage area for a wireless communications system is defined by the union of cells for the deployed base stations. Here, the coverage areas for adjacent or nearby cell sites may overlap one another to ensure, where possible, contiguous communications coverage within the outer boundaries of the system.

When active, a wireless unit receives signals from at least one base station over a forward link or downlink and transmits signals to at least one base station over a reverse link or uplink. Several approaches have been developed for defining links or channels in a cellular communication system, including, for example, TDMA (time-division multiple access), and CDMA (code-division multiple access).

In TDMA communication systems, the radio spectrum is divided into time slots. Each time slow allows only one user to transmit and/or receive. Thusly, TDMA requires precise timing between the transmitter and receiver so that each user may transmit their information during their allocated time.

In CDMA communications systems, different wireless channels are distinguished by different channelization codes or sequences. These distinct channelization codes are used to encode different information streams, which may then be modulated at one or more different carrier frequencies for simultaneous transmission. A receiver may recover a particular stream from a received signal using the appropriate code or sequence to decode the received signal.

For voice applications, conventional cellular communication systems employ dedicated links between a wireless unit and a base station. Voice communications are delay-intolerant by nature. Consequently, wireless units in wireless cellular communication systems transmit and receive signals over one or more dedicated links. Here, each active wireless unit generally requires the assignment of a dedicated link on the downlink, as well as a dedicated link on the uplink.

With the explosion of wireless telephony, however, a growing concern for cellular service providers has been voice quality. As the number of wireless users has continued to blossom, the demands on the system by increasing voice capacity have forced a degradation of the voice quality each user may experience. For the purposes of the present disclosure, reference to voice capacity also includes circuit switched services similar to voice, such as video, for example. Moreover, as voice capacity is increased to support an ever-larger number of wireless users, additional issues, including, for example, uplink interference between these users in a single sector may also surface. A tradeoff exists, therefore, between voice quality and voice capacity.

Consequently, a demand exists for increasing voice quality without unduly influencing the voice capacity of the base station.

SUMMARY OF THE INVENTION

The present invention provides a method of increasing voice quality without unduly influencing the voice capacity of the base station. More particularly, the present invention provides a method of retransmission for one or more voice frames by employing a number of sub-frames. Within the context of the present invention, each voice frame may comprise a plurality of sub-frames. It should be noted that the method of the present invention may be applicable on both the uplink and the downlink.

In one exemplary embodiment of the present invention, at least a first sub-frame of a plurality of sub-frames formed from a first voice frame may be transmitted. If an acknowledgement message is received in response to transmitting the first sub-frame, the transmission of any remaining sub-frames from the first plurality may be terminated. If a non-acknowledgement message is received in response to transmitting the first sub-frame, a second sub-frame is transmitted. The second sub-frame may comprise a copy of the first sub-frame and/or redundant information. Thereafter, another sub-frame from another voice frame may be transmitted. This another sub-frame may be transmitted in response to receiving an acknowledgement message corresponding with the first voice frame and/or a time-out. For the purpose the present disclosure, a time-out may occur if the retransmission scheme corresponding with the voice frame fails by the passage of a time interval.

In another exemplary embodiment of the present invention, a plurality of sub-frames may be formed from a voice frame. Here, the voice frame may be coded. The coded voice frame may then be divided into a number of sub-frames. Thereafter, the sub-frames may be interleaved independently.

In another exemplary embodiment of the present invention, an acknowledgement message may be transmitted in response to receiving a first sub-frame of a first plurality of sub-frames formed from a first voice frame. If an acknowledgement message is transmitted, the remaining sub-frames of the first plurality may not be received. However, if the first sub-frame is not received, a non-acknowledgement message may be transmitted. In response to transmitting the non-acknowledgement message, a second sub-frame of the first plurality may be received. Consequently, the first voice frame may be decoded by combining the first sub-frame and second sub-frame of the first plurality. Thereafter, another sub-frame of another plurality from another voice frame may be received.

In another exemplary embodiment of the present invention, at least a first sub-frame from a first voice frame is transmitted by a base station. If the first sub-frame is received by a wireless unit, an acknowledgement message may be transmitted. Consequently, the remaining sub-frames from that voice frame may not be transmitted. However, if the first sub-frame is not received by the wireless unit, a non-acknowledgement message is transmitted. The base station may then transmit at least another sub-frame from the first voice frame.

These and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below:

FIGS. 6(*a*) and 6(*b*) each depict a table illustrating aspects of the present invention;

Figure 1:
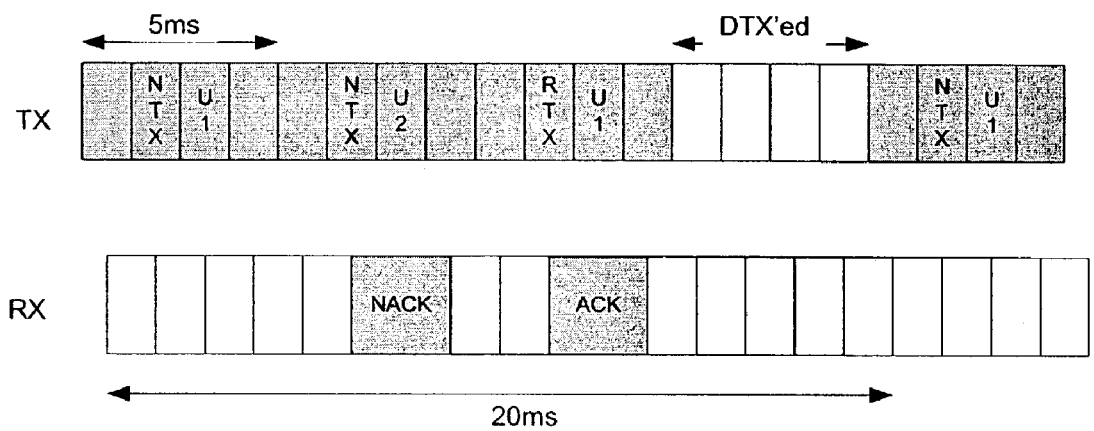
FIG. 1 depicts an embodiment of the present invention.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

In current wireless systems employing the CDMA-based technology, voice frame transmission time may be fixed at intervals of time. For example, in CDMA 2000 1x, the voice frame transmission time may be 20 ms. A full rate, half ($\frac{1}{2}$) rate, quarter ($\frac{1}{4}^{th}$) rate or a one-eighth ($\frac{1}{8}^{th}$) rate frame may be transmitted every interval—e.g., every 20 ms—on both the downlink and the uplink. Consequently, a low frame error rate ("FER") is targeted (e.g., 1% FER) to avoid compromising voice quality.

The capacity of wireless spread spectrum systems may be radio frequency ("RF") limited. For example, a low FER of 1% may not be guaranteed in the presence of large number of users. Here, users on the uplink may interfere with one another due to the non-orthogonal nature of the uplink using CDMA-based technology. This RF limitation may also happen on the downlink because of insufficient power available at the base station necessary to reach a user(s) having a low FER of 1%, for example. Therefore, the system voice capacity may be severely limited.

In view of the above, the present invention provides a method of increasing voice quality without unduly influencing the voice capacity of the base station. More particularly, the present invention provides a method of retransmission for each voice frame that may be used on the uplink and/or the downlink, for example. Within the context of the present invention, each voice frame may comprise a number of sub-frames. The method may include, for example, transmitting (e.g., re-transmitting) a subsequent sub-frame within a voice frame if an initial sub-frame is not received. The reception of the initial sub-frame may be determined by the transmission of an acknowledgement message(s) ("ACK") or non-acknowledgement ("NACK") message(s). Consequently, the RF limitation detailed herein may be overcome by allowing the use of a simple real-time retransmission scheme, such as automatic repeat request ("ARQ") or Hybrid ARQ, for example. As a result, the method supports targeting the first transmission at a higher FER than 1%, for example.

The present invention provides a real time retransmission scheme, such as hybrid ARQ. In so doing, the method promotes increased voice capacity from efficient utilization of the available power in the base station. Moreover, the method advances reduced intercell and intracell interference, thereby increasing the system capacity further.

In one embodiment of the present invention, the method includes transmitting at least a first sub-frame of a plurality of sub-frames formed from a first voice frame. If an acknowledgement message ("ACK") is received in response to transmitting the first sub-frame, the transmission of any remaining sub-frames from the first plurality may be terminated. If a non-acknowledgement ("NACK") message is received in response to transmitting the first sub-frame, a second sub-frame is transmitted (e.g., re-transmitted). The second sub-frame may comprise a copy of the first sub-frame and/or redundant information.

Once the first voice frame is transmitted, retransmitted, received or not received, another sub-frame from another voice frame may be subsequently transmitted. This subsequent sub-frame from another voice frame may be transmitted in response to receiving an ACK. This ACK message may correspond with the first voice frame and/or a time-out associated with retransmitting first voice frame. For the purpose the present disclosure, a time-out may occur if the retransmission scheme corresponding with the voice frame fails by the passage of a time interval.

In another embodiment of the present invention, the method includes forming a plurality of sub-frames from a voice frame. Here, the voice frame may be initially coded. The coded voice frame may be then divided into a number of sub-frames. Thereafter, the sub-frames may be interleaved independently.

In another embodiment of the present invention, the method includes transmitting an acknowledgement ("ACK") message in response to receiving a first sub-frame of a first plurality of sub-frames formed from a first voice frame. If an ACK message is transmitted, the reception of the remaining sub-frames of the first plurality may not be terminated. However, if the first sub-frame is not received, a non-acknowledgement ("NACK") message may be transmitted. In response to transmitting the NACK message, a second sub-frame of the first plurality may be received. Consequently, the first voice frame may be decoded by combining the first sub-frame and second sub-frame of the first plurality.

Once the first voice frame is transmitted, retransmitted, received or not received, another sub-frame from another voice frame may be subsequently transmitted. This subsequent sub-frame from another voice frame may be transmitted in response to receiving an ACK message. This ACK message may correspond with the first voice frame and/or a time-out associated with retransmitting first voice frame. For the purpose the present disclosure, a time-out may occur if the retransmission scheme corresponding with the voice frame fails by the passage of a time interval.

In another embodiment of the present invention, the method includes transmitting at least a first sub-frame from a first voice frame by a base station. If the first sub-frame is received by a wireless unit, an ACK message may be transmitted. Consequently, the remaining sub-frames from that voice frame may not be transmitted. However, if the first sub-frame is not received by the wireless unit, a NACK message is transmitted. The base station then may transmit (e.g., re-transmit) at least another sub-frame from the first voice frame.

Referring to FIG. 1, an embodiment of the present invention of a retransmission scheme is shown. More particularly, FIG. 1 depicts a hybrid ARQ operation for the downlink. Each exemplary voice frame may be set to 20 ms and divided into four 5 ms sub-frames, as supported by CDMA 2000 1x. Here, two users may share the same frame by means of the same Walsh code in a time-multiplexed fashion.

In the embodiment illustrated in FIG. 1, a first user may transmit its first sub-frame in the first depicted 5 ms sub-frame. Similarly, a second user may transmit its first sub-frame in the second depicted 5 ms sub-frame. After transmitting the first sub-frame, both first and second users wait for the ACK/NACK feedback from the receiver. If an ACK is received, the second sub-frame may not transmitted (e.g., DTX'ed). In the example of FIG. 1, the first user receives a NACK and consequently retransmits the sub-frame in the third 5 ms sub-frame. In contrast, the second user receives an ACK and is DTX'ed (e.g., the retransmission of the second sub-frame may be aborted).

For downlink retransmission schemes, such as HARQ, an ACK/NACK feedback may be provided by stealing the transmit power control ("TPC") bits. For example, stealing one (1) or two (2) bits for every 20 ms interval may have a negligible impact on the power control of the system. It should be noted that all sectors in an active set receiving an ACK may not receive the second sub-frame transmission (e.g., DTX'ed). For the purposes of the present disclosure, an active set may consist of sector(s) with which each user may be in communication simultaneously.

Figure 2:
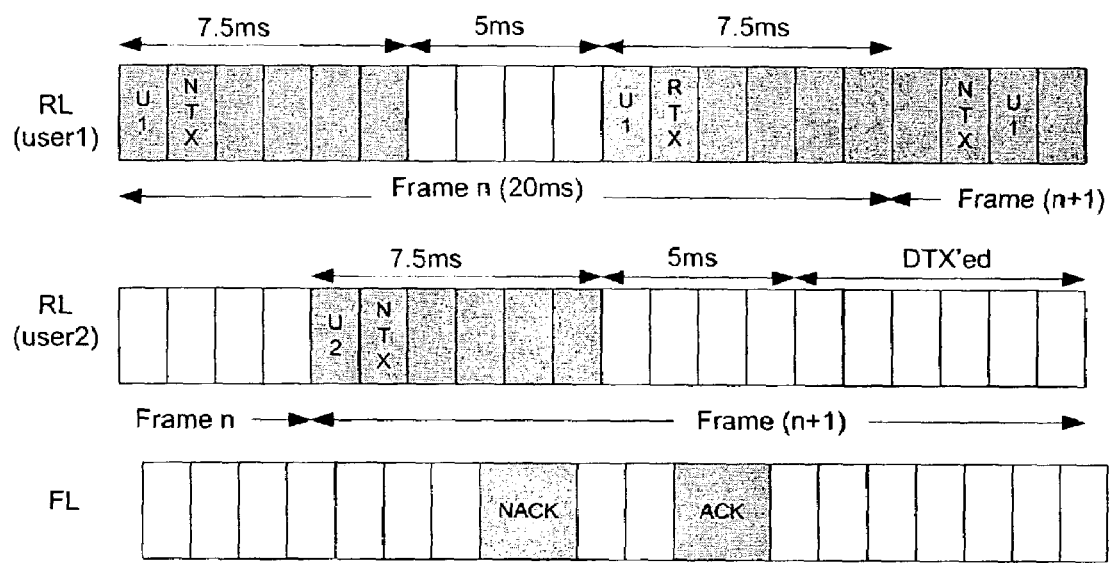
FIG. 2 depicts another embodiment of the present invention.

Referring to FIG. 2, an embodiment of the present invention of a retransmission scheme is shown. More particularly, FIG. 2 depicts a hybrid ARQ operation for the uplink. In the uplink direction, Walsh codes are not shared across the users. A frame of 20 ms, for example, may be divided into two 7.5 ms frames and one 5 ms inter sub-frame gap. Here, a user may retransmit in the second sub-frame if a NACK is received from the base station.

For RL HARQ operation, an ACK/NACK feedback may be provided on the FL through a channel, such as the common power control channel ("CPCCH"), for example. Different users may be allocated different bit positions in the exemplary CPCCH slot. It is also possible here to steal TPC bits for use in providing ACK/NACK feedback. For example, stealing one (1) or two (2) bits for every 20 ms interval may have negligible impact on power control. Users in simplex (e.g., communicating with a single sector) may decode an ACK from the serving cell, while users in a soft handoff ("SHO") may try to decode ACK signal from all the sectors in the active set. The second sub-frame transmission is not transmitted (e.g., DTX'ed) if at least one sector positively acknowledges the first sub-frame.

Figure 3:
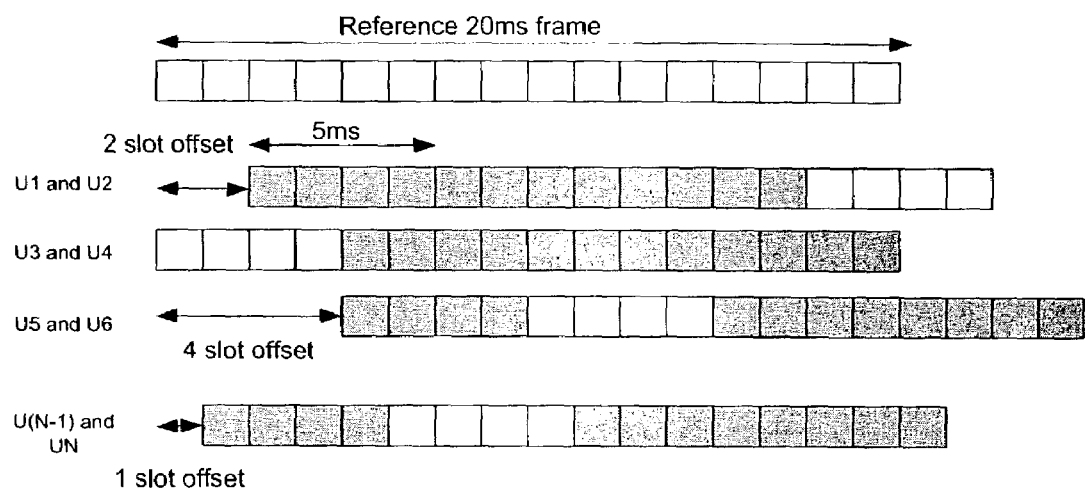
FIG. 3 depicts another embodiment of the present invention.

Transmissions from different users may be offset by an integer number of slots, as shown in FIG. 3. This allows for the avoidance of overlapping sub-frames from different users and may maximize the benefit from DTX'ing the second sub-frame. It should also be noted that DTX'ing at the second sub-frame on the downlink may make a greater base station power fraction (e.g., $E_c/I_{or}$) available for other users, while DTX'ing on the uplink may reduce both intra-cell and inter-cell interference.

Real Time Retransmission

In the present invention, the maximum number of retransmission attempts may be limited so to restrict the total transmission times. In examples described herein, a maximum frame recovery time may be, for example, 20 ms.

Figure 4:
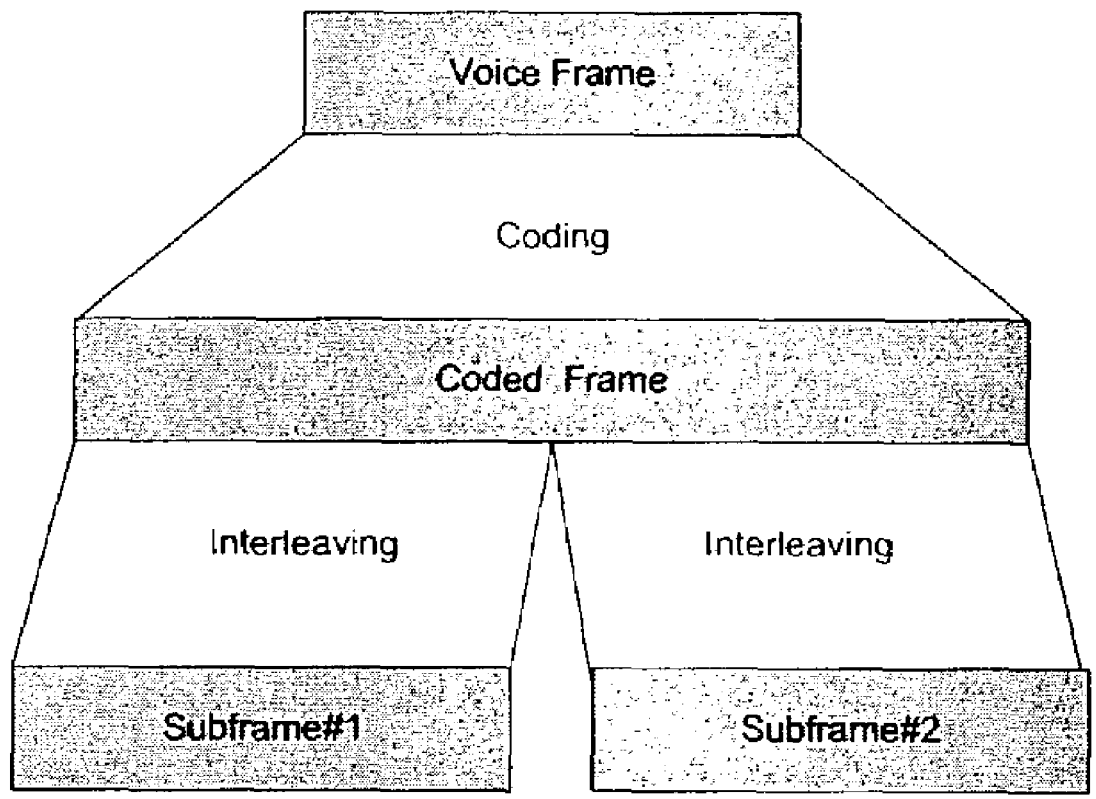
FIG. 4 depicts an aspect of the present invention.
Figure 5:
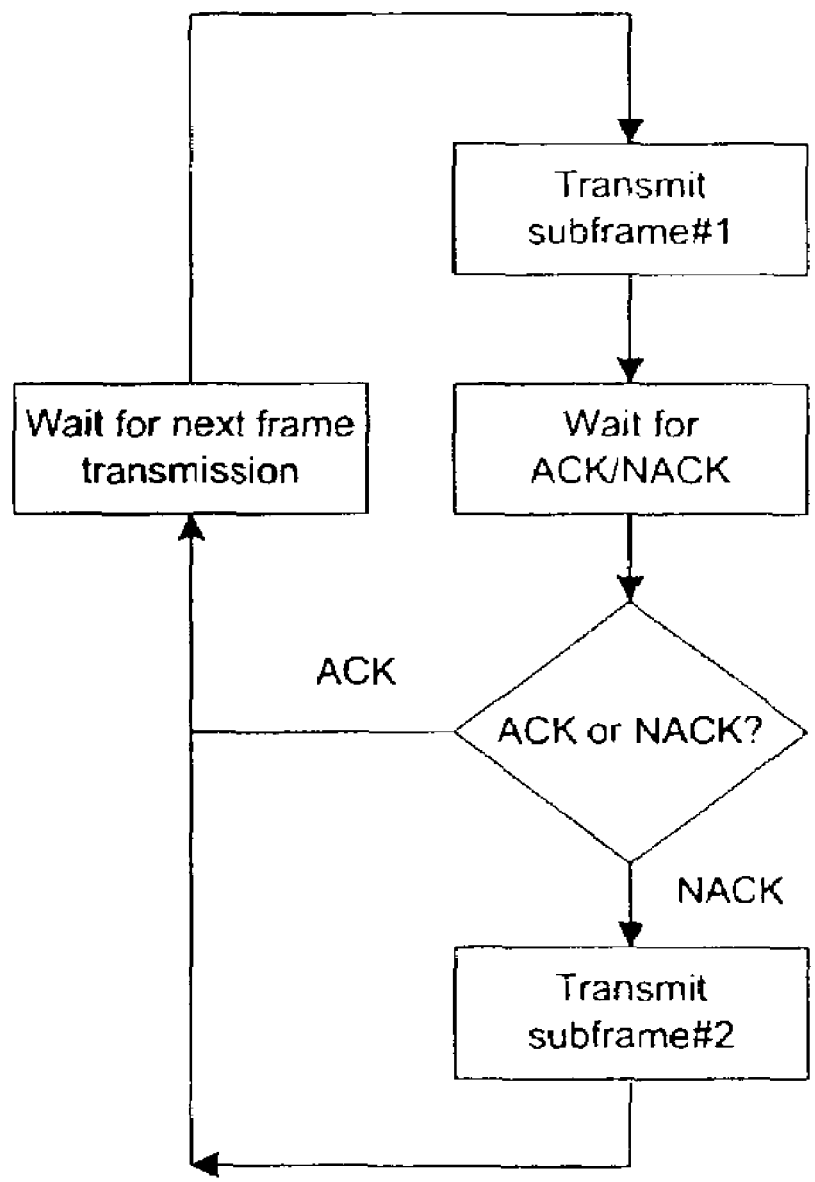
FIG. 5 depicts a flow chart of an embodiment of the present invention.

Referring to FIGS. 4 and 5, an aspect of the present invention is depicted in conjunction with a flow chart of an embodiment of the present invention. As shown, a voice frame is initially coded and then divided into a first sub-frame (#1) and a second sub-frame (#2). Sub-frames #1 and #2 may then interleaved independently. Subsequently, the transmitter first sends sub-frame #1 and then waits for an ACK/NACK from the receiver. The second sub-frame may then be transmitted only if a NACK is received. The receiver may then try to decode the voice frame by combining sub-frame #1 and sub-frame #2. To assist in the decoding operation, the sub-frame #2 may contain redundant information and/or a copy of sub-frame #1.

It should be noted that the 20 ms frame transmission time limit and the two sub-frame transmissions are exemplary aspects of the method. These aspects are used merely for illustrative purposes. Consequently, the principles of this method may be applied to cases for other than 20 ms transmission times, as well as for the case where more than two sub-frames are employed.

Modulation and coding tables for uplink and downlink Hybrid ARQ are shown in FIGS. 6(a) and 6(b), respectively. It should be noted that the coding rate on the uplink may be the same for both sub-frame #1 and sub-frame #2—e.g., the second sub-frame #2 may be an exact copy of the first sub-frame #1. However, for the downlink Hybrid ARQ, the coding rate after receiving the second sub-frame may be different from the coding rate obtained with sub-frame#1—e.g., incremental redundancy Hybrid ARQ.

As the uplink may not be Walsh code limited, a more robust modulation and coding might always be chosen. This is a consequence of the uplink using length 16 Walsh codes, for example. However, a less robust modulation and coding may be required on the downlink because higher length Walsh codes are used, as shown in FIG. 6(b).

Uplink Operation

Figure 7:
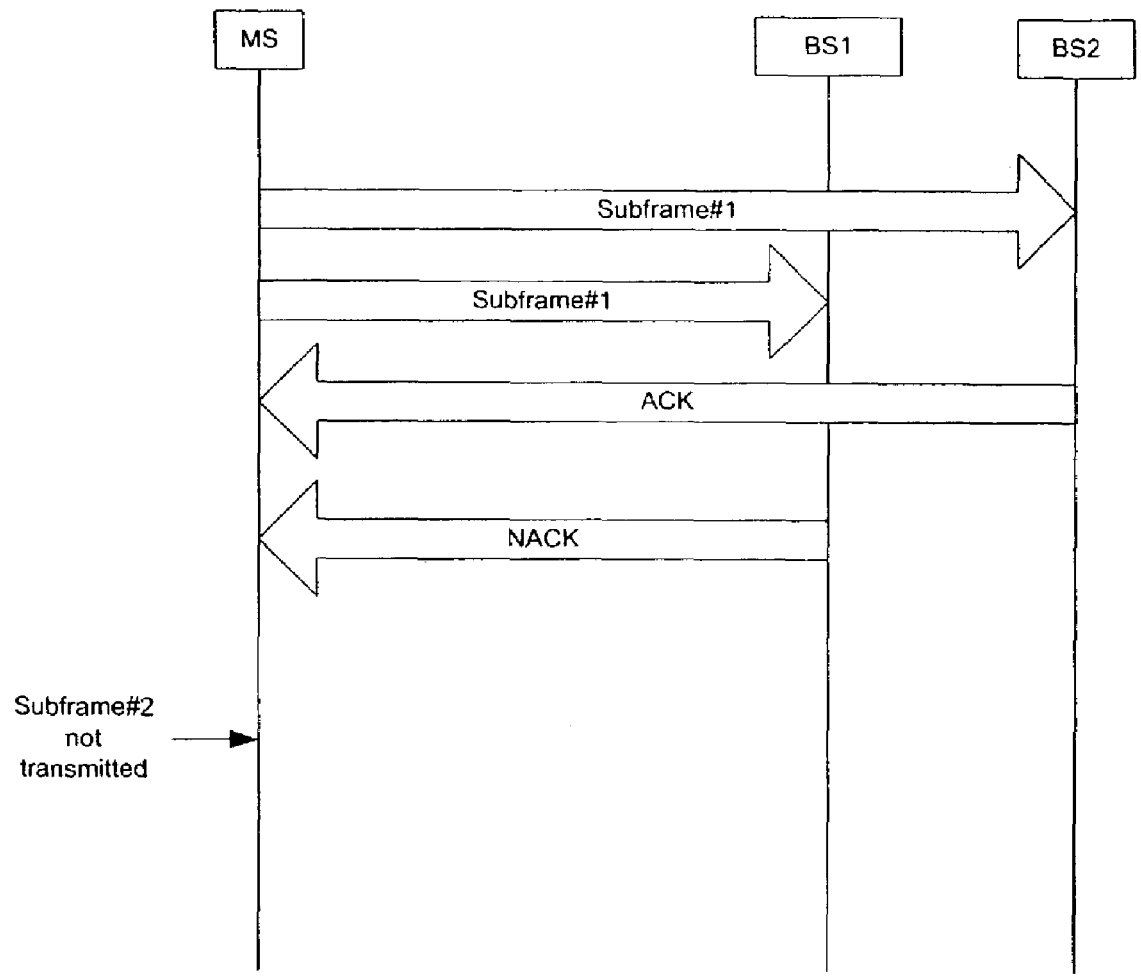
FIG. 7 depicts an aspect of the present invention.
Figure 8:
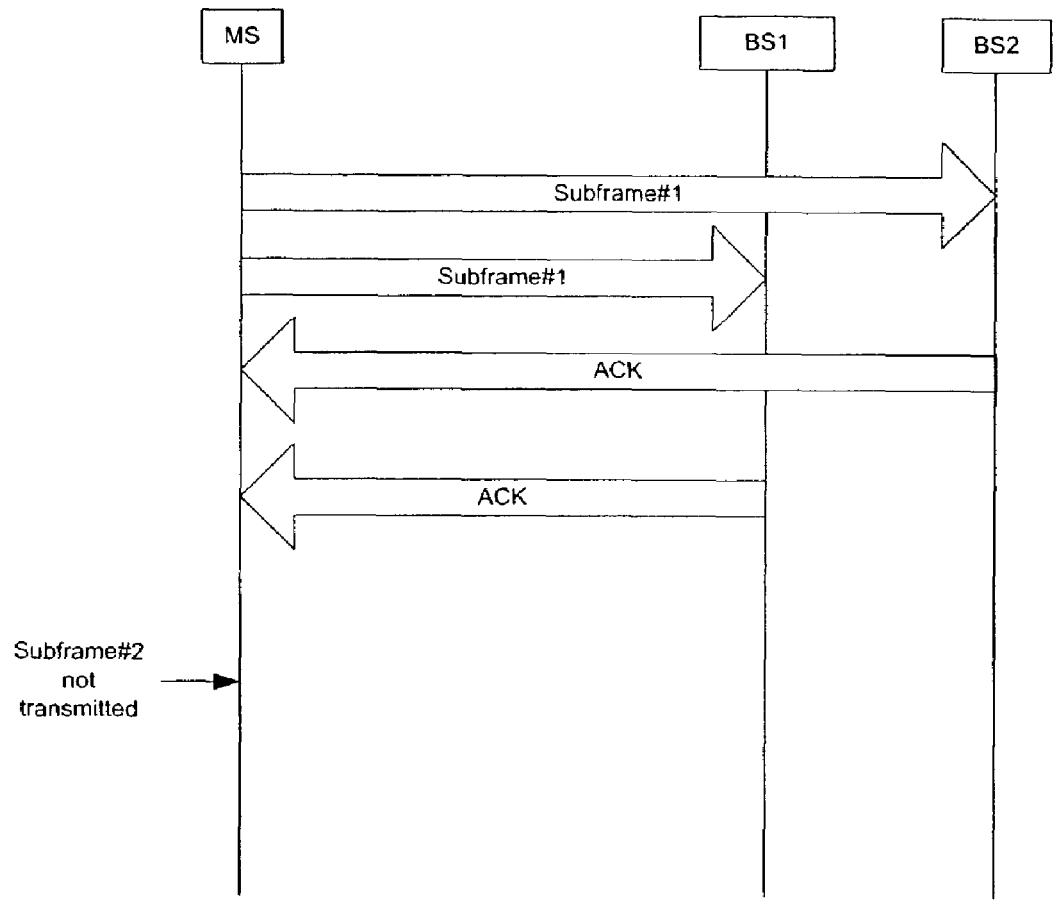
FIG. 8 depicts an aspect of the present invention.
Figure 9:
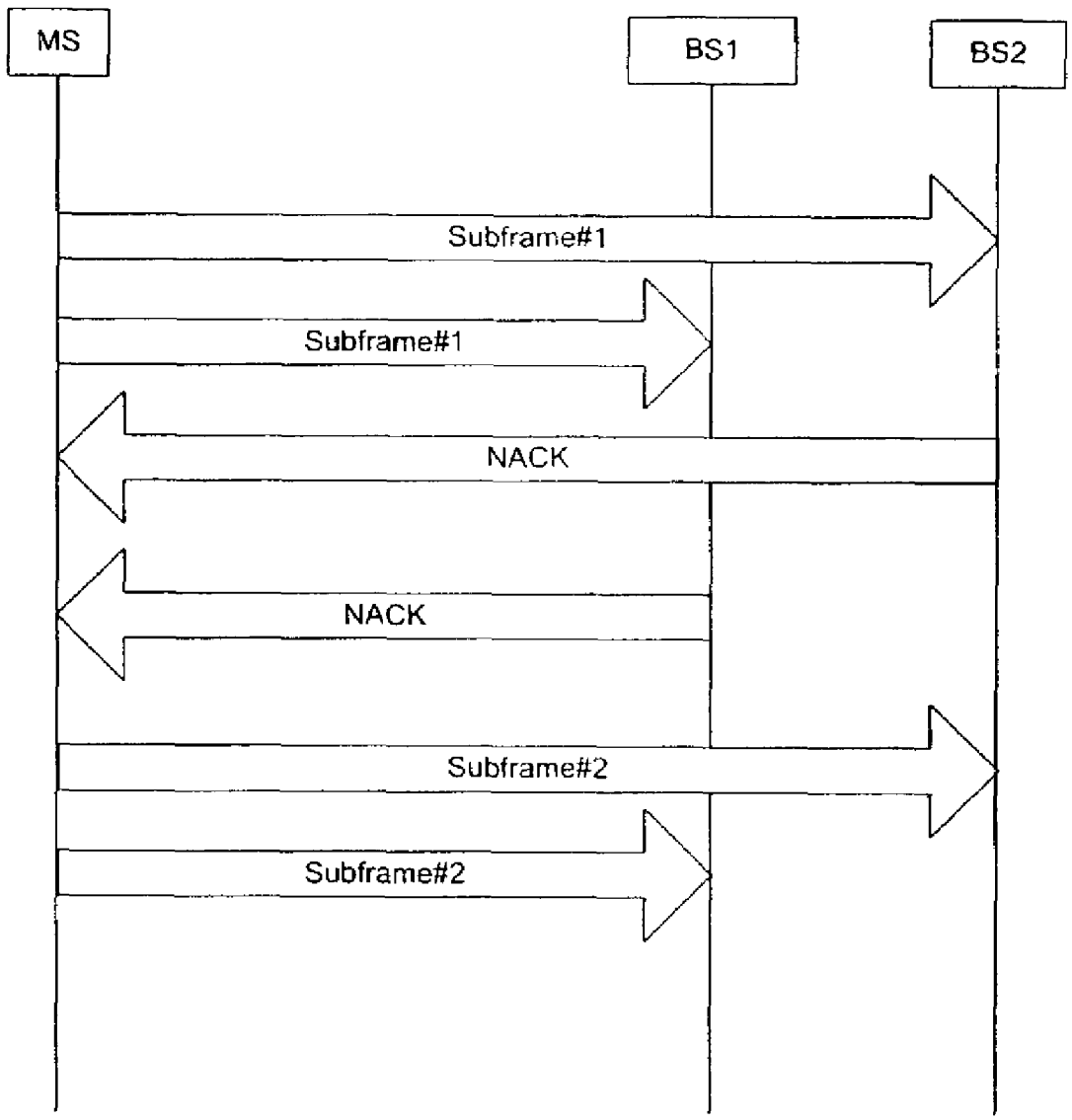
FIG. 9 depicts an aspect of the present invention.

In the uplink direction, a wireless unit first transmits the first sub-frame. Thereafter, the wireless unit waits for an ACK/NACK feedback response from the base stations in its active set. The second sub-frame may then be transmitted only if a NACK is received from all the base stations, as depicted by example in FIG. 9. If an ACK is received from at least one base station, however, the second sub-frame may not be transmitted. This scenario is illustrated in FIGS. 7 and 8. In circumstance where the wireless unit is in communication with only one base station, the ACK/NACK feedback is provided from this single base station.

Downlink Operation

Figure 10:
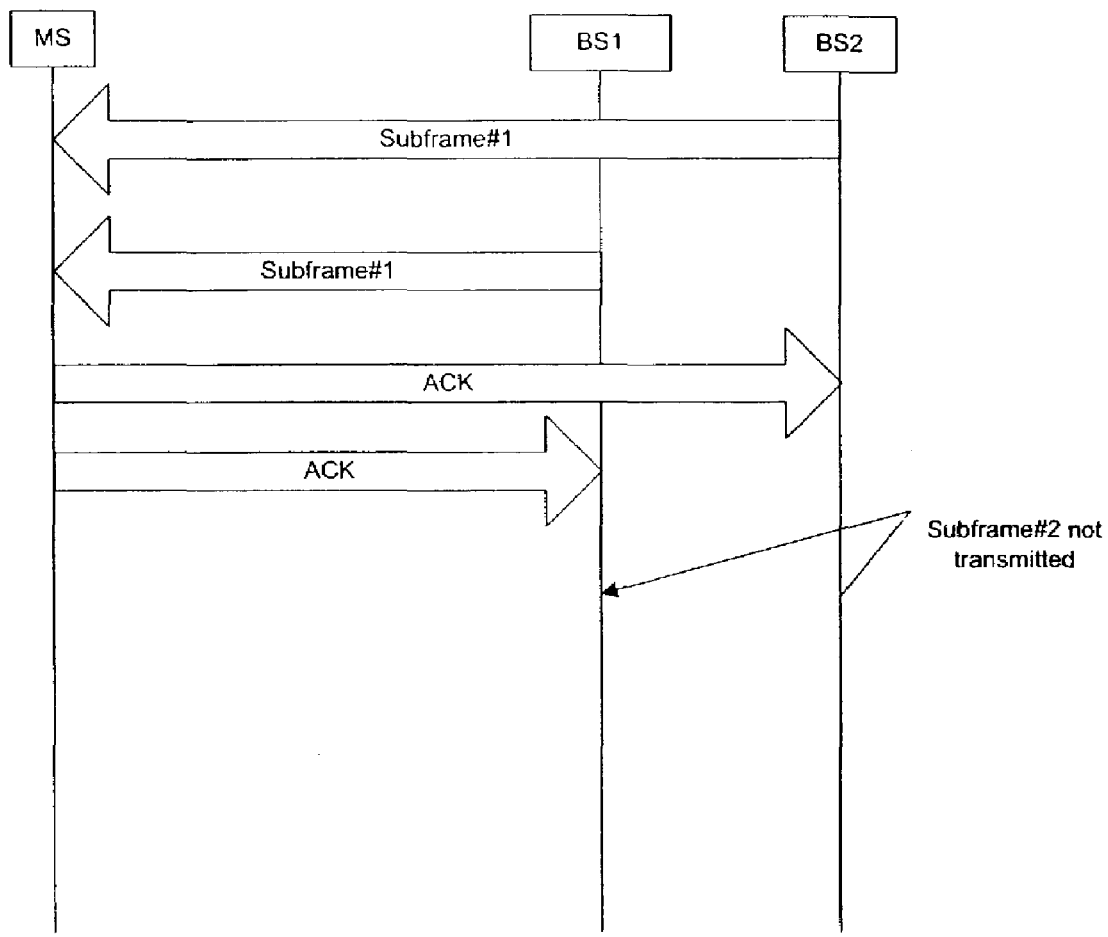
FIG. 10 depicts an aspect of the present invention.
Figure 11:
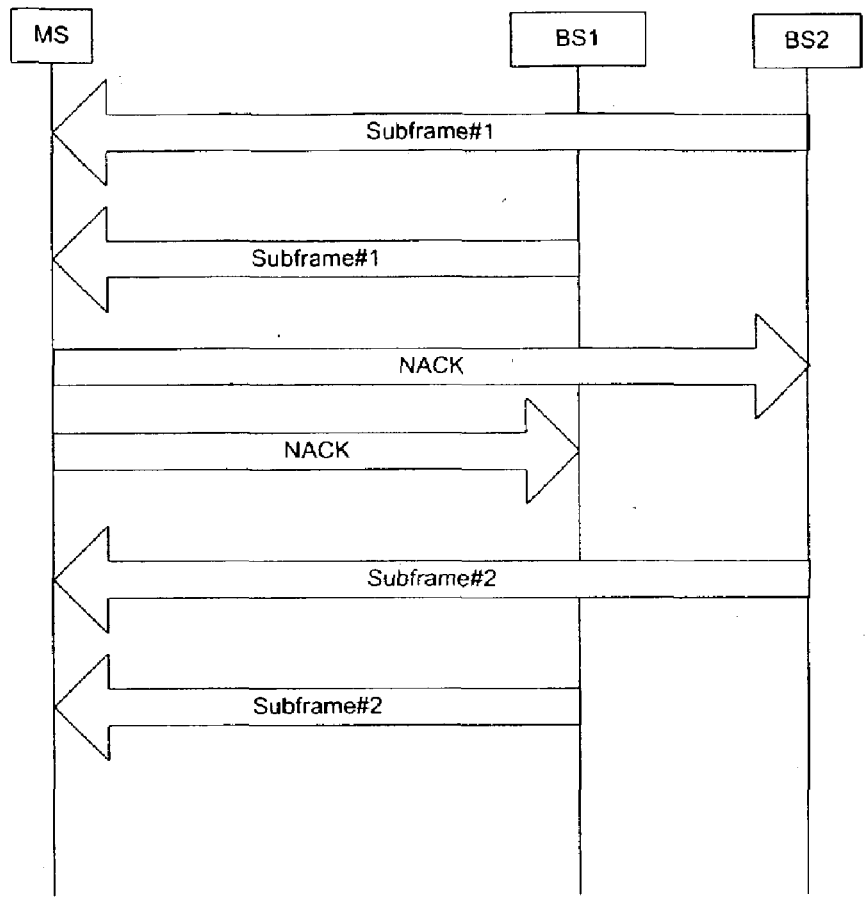
FIG. 11 depicts an aspect of the present invention.

In the downlink direction, sub-frames may be transmitted from all the sectors in the user's active set. Each sector may transmit the first sub-frame and thereafter waits for an ACK/NACK from the wireless unit. A sector may then transmit the second sub-frame if a NACK is received from the wireless unit, as shown by example in FIG. 11. Otherwise, if an ACK is received, the second sub-frame may not be transmitted. This scenario is illustrated in FIG. 10.

Figure 12:
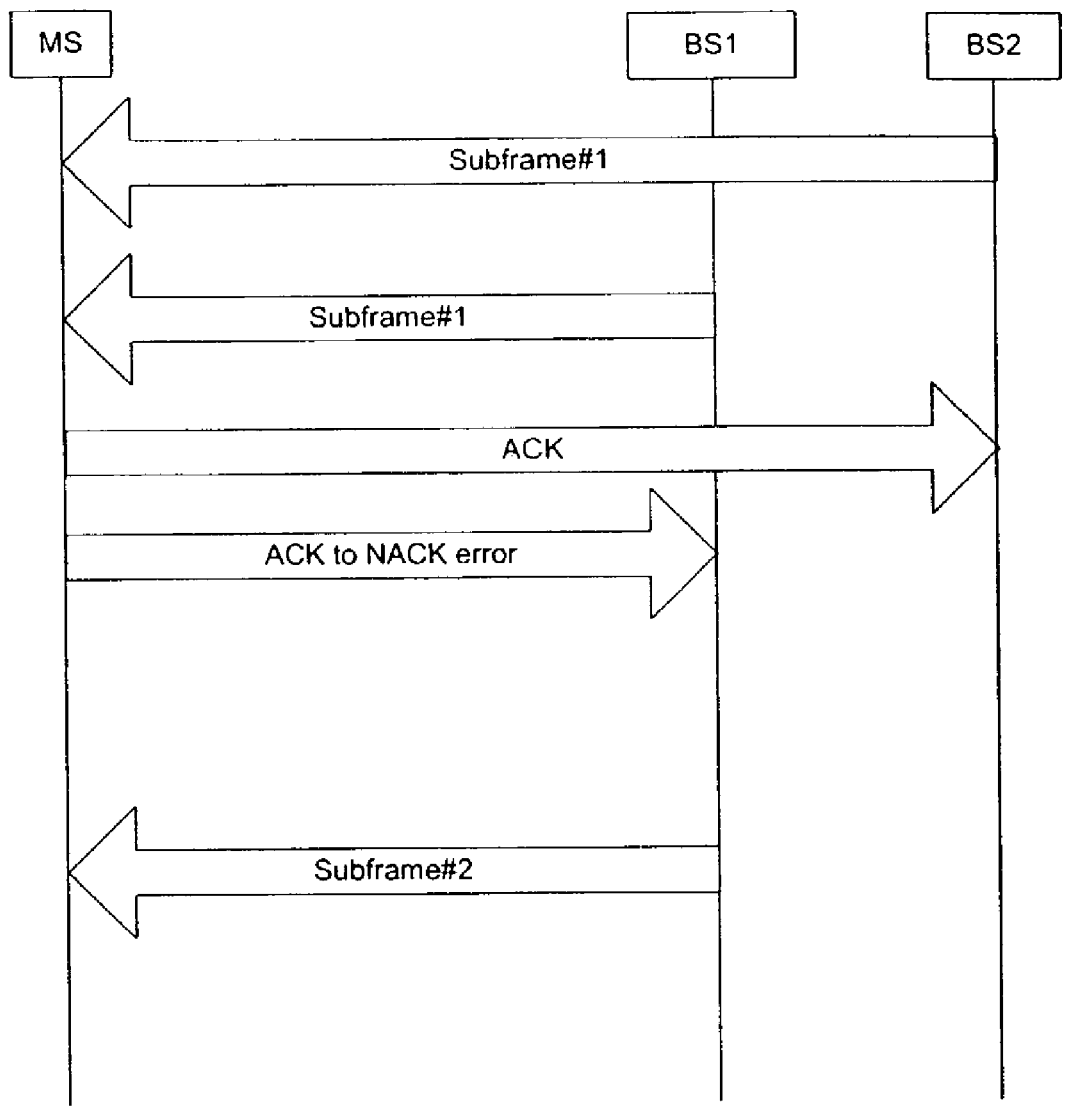
FIG. 12 depicts an aspect of the present invention.
Figure 13:
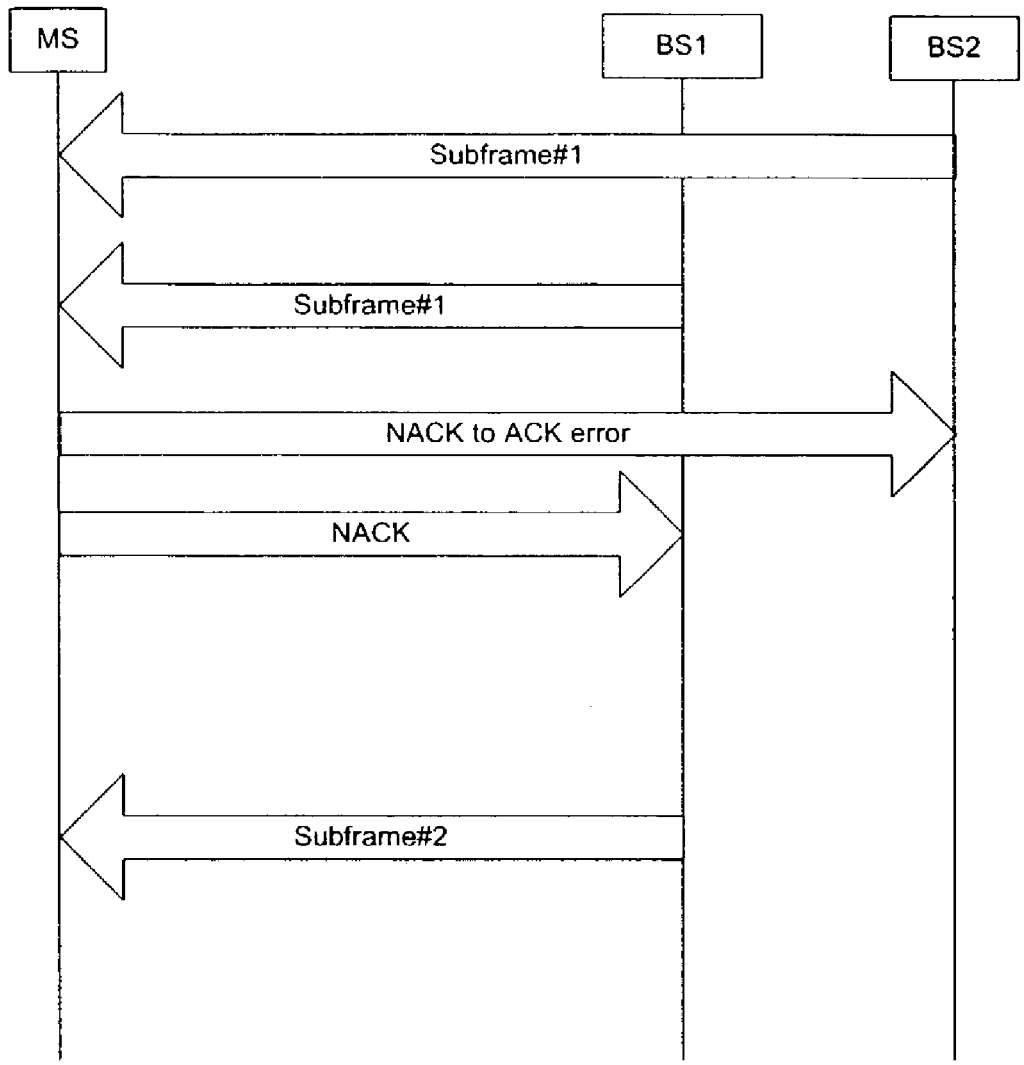
FIG. 13 depicts an aspect of the present invention.

In case of ACK to NACK error at some sectors, the second sub-frame may be transmitted from the base station receiving the NACK. This scenario is illustrated in FIG. 12. On the other hand, in case of NACK to ACK error, the second sub-frame may not be transmitted from the sector receiving an ACK, as shown in FIG. 13. The voice frame may still be received successfully if some of the sectors not making the NACK to ACK error, however, retransmit the second sub-frame.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of wireless communication comprising:
   forming a first plurality of sub-frames from a first voice frame by coding the first voice frame and dividing the first coded voice frame into the first plurality of sub frames, the first plurality of sub-frames comprising a first and a second sub-frame;
   allocating first and second time periods for transmitting the first and second sub-frames, respectively;
   transmitting at least the first sub-frame in the first time period; transmitting at least the second sub-frame in the second time period in response to receiving a non-acknowledgement message;
   terminating transmission of the second sub-frame in response to receiving an acknowledgement message to bypass transmission during the second time period;
   transmitting at least another sub-frame from another voice frame in response to at least one of receiving an acknowledgement messages and a time-out condition, wherein the acknowledgement message is received in response to the receipt of one of the sub-frames of the first plurality; and
   forming the at least another plurality of sub-frames from the another voice frame, the step of forming another plurality of sub-frames comprises:
   coding the another voice frame; and
   dividing the another coded voice frame into the another plurality of sub-frames.

2. The method of claim 1, wherein the second sub-frame comprises at least one of a copy of the first sub-frame and redundant information.

3. The method of claim 1, wherein the step of forming a first plurality of sub-frames further comprises:
   interleaving the first plurality of sub-frames independently.

4. The method of claim 1, further comprising:
   terminating transmitting of any remaining sub-frames from the first plurality in response to receiving an acknowledgement message.

5. A method of wireless communication comprising:
   transmitting an acknowledgement message in response to receiving, during a first time period, a first sub-frame of a first plurality of sub-frames formed from a first voice frame by coding the first voice frame and dividing the first coded voice frame into the first plurality of sub-frames, the acknowledgement message indicating that transmission of a second sub-frame of the first plurality of sub-frames during a second time period allocated for transmission of the second sub-frame is to be terminated to bypass transmission during the second time period;
   receiving, in response to transmitting the acknowledgement message, at least one of a second plurality of sub-frames formed from at least one second voice frame by coding said at least one second voice frame and dividing said at least one second coded voice frame into the second plurality of sub-frames;
   transmitting a non-acknowledgement message in response to failing to receive the at least first sub-frame;
   receiving at least a second sub-frame of the first plurality in response to transmitting a non-acknowledgement message, wherein the second sub-frame of the first plurality comprises at least one of a copy of the first sub-frame and redundant information; and
   decoding the first voice frame by combining the first sub-frame and second sub-frame of the first plurality.

6. The method of claim 5, wherein the first plurality of sub-frames is formed by coding the first voice frame and dividing the first coded voice frame into a first plurality of sub-frames.

7. The method of claim 5, further comprising:
   receiving at least another sub-frame of another plurality from another voice frame in response to transmitting another acknowledgement message.

8. The method of claim 7, further comprising:
   terminating receiving any remaining sub-frames of the first plurality in response to transmitting an acknowledgement message.

* * * * *